No. 681,169. Patented Aug. 20, 1901.
A. HAMILTON.
FRUIT PICKER'S SACK.
(Application filed Jan. 8, 1901.)
(No Model.)
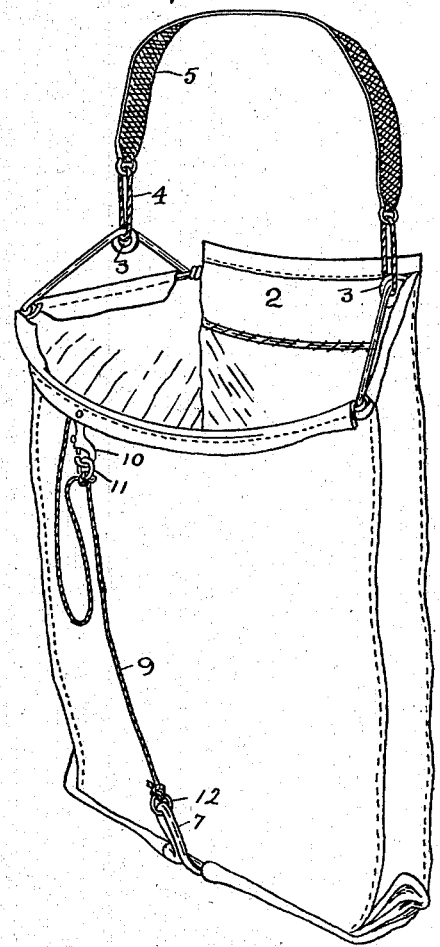
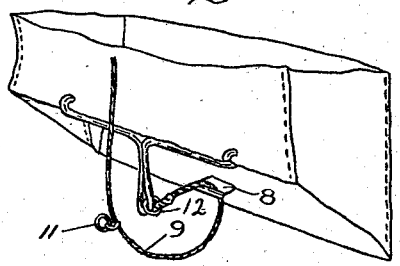
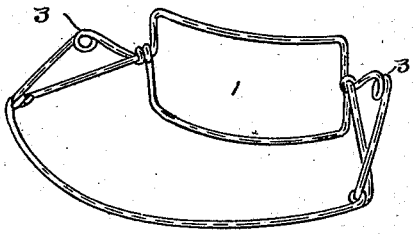
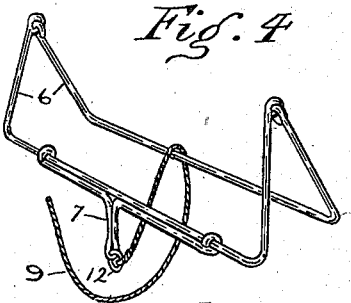
Witnesses
Harry A. Brooks
Mattie McGinnis
Inventor
Alexander Hamilton
By
Hazard & Harpham
Attorneys

United States Patent Office.

ALEXANDER HAMILTON, OF ALHAMBRA, CALIFORNIA.

FRUIT-PICKER'S SACK.

SPECIFICATION forming part of Letters Patent No. 681,169, dated August 20, 1901.

Application filed January 8, 1901. Serial No. 42,557. (No model.)

*To all whom it may concern:*

Be it known that I, ALEXANDER HAMILTON, a citizen of the United States, residing at Alhambra, in the county of Los Angeles, State of California, have invented new and useful Improvements in Fruit-Pickers' Sacks, of which the following is a specification.

My invention relates to sacks used by fruit-gatherers to hold the fruit while they are picking; and the object is to provide a cheap and simple fruit-holding sack whose contents can be emptied without its being removed from the wearer and without bruising the fruit. I accomplish this object by the sack described herein and illustrated in the accompanying drawings, forming a part hereof, in which—

Figure 1 is a perspective view of my sack with the bottom closed. Fig. 2 is a fragmentary view of the lower portion of the same, showing the bottom open. Fig. 3 is a view of the top frame of the sack. Fig. 4 is a view of the bottom frame of the sack and a part of the closing-cord.

In the top of my sack is affixed, preferably by sewing, the top frame 1, as shown in Fig. 1, which provides a wide flaring mouth having the back wall 2 slightly curved to the shape of the wearer and extending above the front wall of the sack to prevent the fruit being thrown over the sack when the wearer is picking fruit and leaning forward. At each side in the top frame are eyes 3 for the reception of cords 4, which fasten shoulder-strap 5 to the sack. These cords may be lengthened or shortened to adjust the size of the shoulder-strap to the wearer.

The bottom of the sack is provided with hinged frame 6, the front of which is provided with locking-tongue 7, rotatable thereon, which in closing the bottom of the sack passes through aperture 8 in the back wall of the bottom and around under the back wire and locks the edges together and is held in its locked position by closing-cord 9, which is fastened thereto, being attached to snap-hook 10 by means of ring 11, adjustable thereon.

In order to make the size of the sack smaller to adapt it for use in picking heavy fruits, I provide a ring 12 in the end of the locking-tongue and draw it up and fasten it in the snap-hook. By forming the end of the locking-tongue so that it could be fastened into the snap-hook ring 12 could be omitted. When the desired quantity of fruit is in the sack, the ring is unfastened from the snap-hook, and by means of the closing-cord the bottom is allowed to gradually open, and the fruit is deposited in the desired receptacle without bruising.

I am aware that it is not new to make "A flexible bag or sack having a lower discharge-opening, a frame secured contiguous to the upper end of the bag or sack, and a stretcher-frame secured to the lower portion of the sack, said stretcher-frame being independent of and disconnected from the upper frame," or "A bag or sack having a discharge-opening, a closure for said opening, a stretcher-frame secured to the bag or sack contiguous to the discharge-opening, and means connected with said frame and with the closure for securing the latter across the discharge-opening," and I do not claim the same; but What I do claim, and desire to secure by Letters Patent, is—

1. In a fruit-picker's sack, the combination of a sack having an open mouth with a frame adapted to hold said mouth open; and an open bottom having a hinged frame affixed to the edges of the walls of the bottom; a locking-tongue rotatably mounted on the front part of said bottom frame, adapted to pass over and then under the back part of said frame and lock the front and back together; and means to hold said tongue in its locked position.

2. In a fruit-picker's sack, the combination of a sack having a mouth with the back wall extending above the front; a frame affixed to the edges of the walls forming said mouth, having eyes in the sides thereof; adjustable cords in said eyes affixed to a shoulder-strap; a shoulder-strap; an open bottom having a hinged frame affixed to the edges of the walls forming said bottom; a locking-tongue rotatably mounted on the front part of said frame, adapted to pass over and then under the back member of said frame and lock them together, and means to hold said tongue in its locked position.

3. In a fruit-picker's sack, having an open mouth and an open bottom, a hinged frame adapted to be fastened to the walls forming the bottom; a locking-tongue on one of the members of said bottom frame adapted to pass over and then under the other member and lock them together; and means to hold said tongue in its locked position.

4. In a fruit-picker's sack, having both the top and bottom open, the combination of a frame adapted to be fastened to the walls forming the mouth thereof, and keep said mouth open; a hinged frame adapted to be fastened to the walls forming the bottom thereof; a locking-tongue on one of the members of said bottom frame adapted to pass over and then under the other member and to lock the two members together and thereby close the bottom of the sack, and means to hold said tongue in its locked position, and to vary the holding capacity of said sack, substantially as described herein.

In witness that I claim the foregoing I have hereunto subscribed my name this 31st day of December, 1900.

ALEXANDER HAMILTON.

Witnesses:
   J. T. HALEY,
   W. H. STEPHENS.